Figure 3:
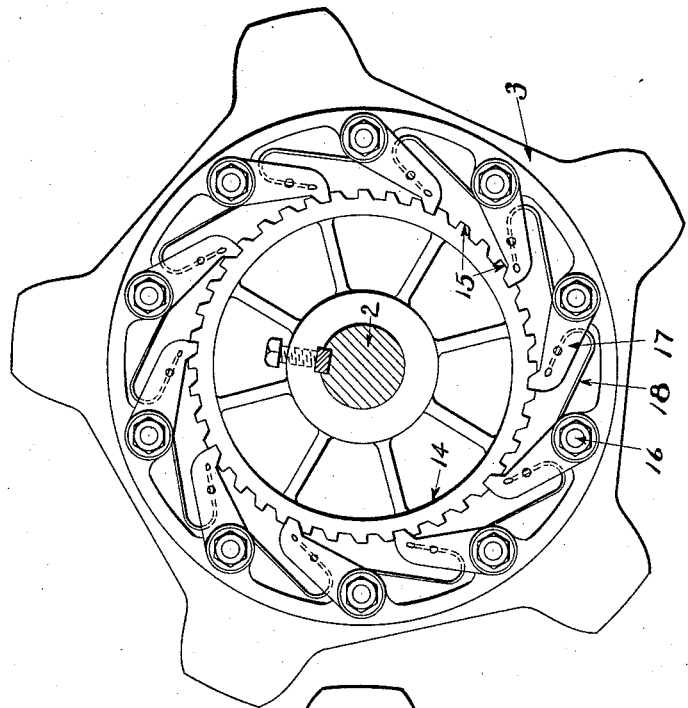

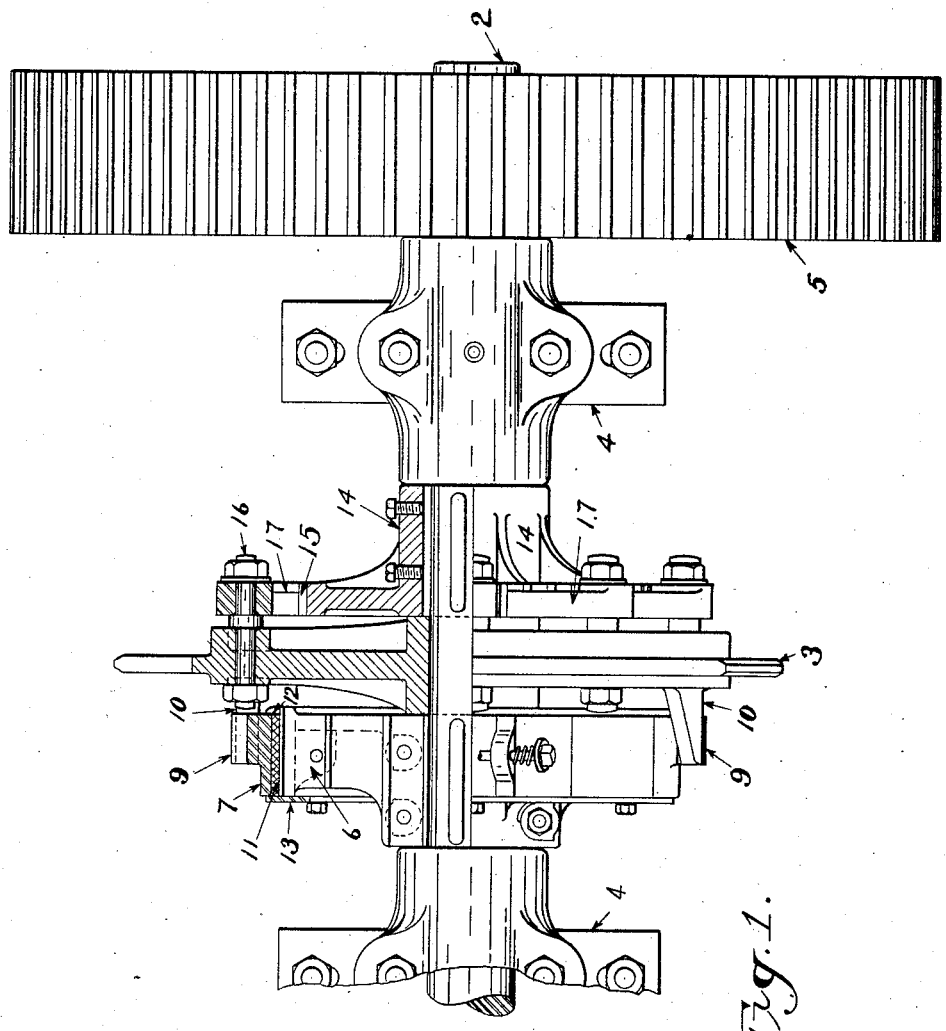

G. E. HUTTELMAIER.
DRIVING MECHANISM FOR HAULAGE SYSTEMS.
APPLICATION FILED DEC. 23, 1911.

1,063,033.

Patented May 27, 1913.

2 SHEETS—SHEET 2.

WITNESSES

INVENTOR

UNITED STATES PATENT OFFICE.

GUSTAVE E. HUTTELMAIER, OF SCOTTDALE, PENNSYLVANIA.

DRIVING MECHANISM FOR HAULAGE SYSTEMS.

1,063,033.  Specification of Letters Patent.  Patented May 27, 1913.

Application filed December 23, 1911. Serial No. 667,509.

*To all whom it may concern:*

Be it known that I, GUSTAVE E. HUTTELMAIER, a citizen of the United States, residing at Scottdale, in the county of Westmoreland and State of Pennsylvania, have invented a new and useful Driving Mechanism for Haulage Systems, of which the following is a specification.

My invention relates to the construction and operation of the driving mechanism used in actuating haulage systems in which an endless chain or equivalent device is employed to actuate and control the movement of a series of cars, wagons, or similar wheeled vehicles, in transferring such vehicles from place to place.

The invention more particularly relates to the construction of a chain driving mechanism employed in controlling the operation of the down haul chain in regulating the downward movement of a series of cars or trains of cars upon an inclined track, such as the car hauls used in connection with the handling of mined materials from a shaft or mine or other source of supply. In such inclined car hauls, two endless chains ordinarily are employed, one traveling upwardly on the incline and having means engaging with the cars to raise the cars, the other chain moving or controlling the movement of the cars downwardly on the incline. The down haul chain of such car hauls is a retarding device whose purpose is to prevent the cars or wagons which descend the inclines by gravity from running away on the inclined track on which they travel.

Heretofore such down haul chains have been positively driven, the relative movement of the up haul and down haul chains being controlled by a system of gearing connected to and positively driven by a motor, one motor common to both usually being employed. In such haulage systems, car blockades unavoidably occur at times, and the occurrence of a blockade upon the down haul track brings the cars on the down haul track to a stop so as to arrest temporarily their further downward movement. As the movement of the down haul chain is continuous, this chain attempts to enforce the down haul movement of the cars or series of trains of cars, and as a consequence, wreckage and other damage to the cars and to the car haul mechanism is the result of such attempts of the car haul to move the blockaded cars.

One object of my invention is to provide a driving mechanism for car hauls having novel means whereby the operation of the car haul mechanism and the handling of the cars are automatically regulated and controlled, and liability of breakage or other damage to the car haulage system and cars forming part thereof is avoided and overcome.

Another object of this invention is to provide a car haul driving mechanism having improved means whereby continuous operation of the driving mechanism is permitted when the down haul chain is brought to rest without liability of injury to the down haul chain.

Further objects of the invention will appear as the invention is more fully disclosed hereinafter.

Figure 2:
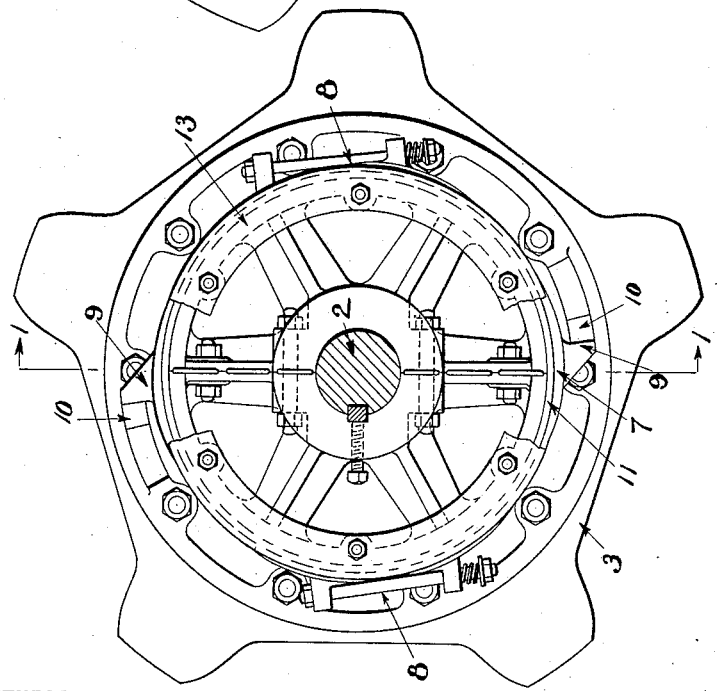

Referring to the accompanying drawings, forming part of this specification, Figure 1 is a plan partly in section, the section being taken on the line I—I of Fig. 2 showing a driving sprocket wheel, friction drive and safety ratchet wheel as constructed and arranged on the head shaft of a down car haul. Fig. 2 is an elevation partly in section of the apparatus shown in Fig. 1. Fig. 3 is an elevation showing the opposite or ratchet wheel side of the sprocket wheel shown in the preceding figures.

In the drawings, 2 designates the head shaft for the down haul chain of a haulage system, having a chain driving sprocket wheel 3 mounted thereon. The sprocket wheel 3 as shown is rotatable on this shaft, instead of as heretofore, being keyed or otherwise secured on the shaft so as to always rotate therewith. When erected in place, the head shaft 2 is mounted in suitable bearings 4, 4 which are located on opposite sides of and adjacent to the sprocket wheel 3. One end of the shaft 2 projects through one of the bearings therefor, and is provided on its overhanging end with a suitable driving gear 5 through which the driving shaft 2 is positively rotated. The gear 5 on the end of the head shaft 2 is connected by suitable slow down gearing (not shown) to a driving motor which may be of any approved type. Keyed or otherwise secured on the shaft 2 so as to rotate therewith, is a friction wheel 6 which as shown is split, the two halves of the wheel being bolted together in place on the shaft 2. A friction band 7, which is made in sections, surrounds the periphery of the friction wheel, the sections of the band being adjustably secured together by the bolts 8. Each section of the friction band has a projecting lug 9 which extends outwardly from the surface thereof and which is arranged to engage with the lugs 10 on the one face of the sprocket wheel 3. A lining 11 of fiber is provided between the friction faces on the friction band and friction wheel, the peripheral flange 12 on one side of the friction wheel 6 and the removable annular ring 13 on the opposite side thereof projecting outwardly so as to maintain the fiber lining in place and prevent sidewise movement thereof. Secured by a key or in an equivalent manner on the shaft 2 on the opposite side of the sprocket wheel 3, is a ratchet wheel 14 having a series of teeth 15 on the periphery thereof, and pivoted on the bolts 16 at intervals on one face of the sprocket wheel are ratchet pawls 17 which are arranged to engage with the teeth 15 in the ratchet wheel. The pivoted pawls 17 are yieldingly held in engagement with the teeth 15 of the ratchet wheel 14 by means of the leaf springs 18.

From the above description it will be readily seen that the sprocket wheel 3 is arranged to be frictionally driven by the shaft 2 upon which the wheel 3 is loosely mounted, and that the head shaft 2 can be rotated in the same direction as the wheel 3 is rotated, at an angular velocity greater than that of the sprocket wheel, while rotation of the sprocket wheel 3 in this same direction, at an angular velocity greater than that of the shaft 2 on which the wheel is mounted, is prevented and made impossible.

In the operation of a car haul equipped with my improved chain driving mechanism, when the apparatus is started in operation, no wagons or cars will be attached to the down haul chain until after a number have been raised to the head of the incline by the up haul chain. Meantime, the down haul chain will be operating idly. The friction drive by which the sprocket wheel 3 is connected to the head shaft 2 for the down haul chain has been adjusted so that the friction drive will exert power sufficient only to overcome the frictional resistance of the entire down haul movement. Should, for any reason such as a blockade of cars, the derailing of a car or the formation of any other obstruction, the power become increased, the friction drive will slip and the positively driven head shaft 2 will continue to rotate while the sprocket wheel 3 and down haul chain thereon will be stopped. As soon as sufficient cars or wagons collect on and engage with the down haul chain, such cars or wagons, by their own weight, become a power medium for moving the chain. Should this force or effect not be controlled, the tendency of the downwardly moving cars would be to increase their speed and run away upon the incline. Any such tendency of the cars to increase their speed and run away with the down haul chain to which they are attached is prevented with my improved construction, as the pawls 17 on the sprocket wheel 3 will engage with the teeth 15 in the ratchet wheel 14 on the shaft 2 and prevent rotation of the sprocket wheel 3 at a speed greater than that of the shaft 2 on which it is mounted. As the shaft 2 is positively rotated at a uniform speed independently of the load thereon by the shaft driving motor and intermediate slow down gearing, the shaft is prevented from increasing its speed of rotation above that desired, so that running away of the cars engaging the down haul chain is effectually prevented.

The advantages of my invention will be apparent to those skilled in the art. By the application of my improved chain driving mechanism to the down haul chain of a haulage system, damage to the chain and its driving mechanism caused by accidents to the cars or wagons being moved by said chain, is automatically prevented and overcome, and the posibility of running away of the cars and down haul chain is avoided.

The apparatus is simple and is easily kept in repair, and the improved driving mechanism can be readily applied to existing haulage systems.

Modifications in the construction and arrangement of the parts may be made without departing from my invention as defined in the claims.

I claim:

1. A driving mechanism for chains and the like comprising a head shaft having means whereby said shaft is positively rotated, a chain driving wheel rotatably mounted on said shaft, means connecting the shaft and wheel permitting rotation of said shaft and wheel in one direction at varying angular velocities, and means connecting the shaft and wheel preventing rotation of said wheel in the opposite direction at a greater angular velocity than said head shaft.

2. A driving mechanism for chains and the like comprising a head shaft having means whereby said shaft is positively rotated, a chain driving wheel rotatably mounted on said shaft, means connecting the shaft and wheel permitting relative angular rotation of said shaft and wheel in one direction, and means connecting the shaft and wheel preventing rotation of the wheel on said head shaft in the opposite direction.

3. A driving mechanism for chains and the like comprising a head shaft having means whereby said shaft is positively rotated, a chain driving wheel rotatably mounted on said shaft, wheel driving means connecting the shaft and wheel permitting relative angular movement of the shaft with respect to the wheel in one direction, and means connecting the shaft and wheel preventing relative angular movement of the wheel on the shaft in the opposite direction.

4. In a car haulage system a chain sprocket wheel, a head shaft on which said wheel is rotatably mounted, means whereby said shaft is positively driven, means frictionally connecting said wheel and shaft for driving said wheel, and independent means connecting the wheel and shaft and preventing rotation in one direction of the wheel on said shaft.

5. In a car haulage system, a sprocket wheel, a head-shaft on which said wheel is rotatably mounted, means whereby said shaft is positively driven, a friction wheel keyed on and rotated by said shaft, a friction band engaging with said friction wheel to drive the sprocket wheel, a ratchet wheel keyed and rotating with the shaft, and a ratchet pawl on the sprocket wheel engaging with the teeth of said ratchet wheel, said pawl and ratchet wheel operating to prevent rotation in one direction of the sprocket wheel on the head shaft.

6. In a car haulage system, a down haul chain sprocket wheel, a head shaft on which said wheel is rotatably mounted, means whereby said shaft is positively driven, a friction clutch connecting the shaft and sprocket wheel whereby said wheel is driven by the shaft, and a pawl and ratchet wheel connecting the sprocket wheel and shaft whereby rotation of the wheel on the shaft in one direction is prevented.

7. In a car haulage system, a down haul chain sprocket wheel, a head shaft on which said wheel is rotatably mounted, means whereby said shaft is positively driven, means for frictionally connecting the shaft and sprocket wheel whereby said wheel is driven by the shaft, and a pawl and ratchet wheel connecting the sprocket wheel and shaft to prevent rotation in one direction of the wheel on the shaft.

8. In a car haulage system, a down haul chain sprocket wheel, a head shaft on which said wheel is rotatably mounted, means whereby said shaft is positively driven, means for frictionally driving the sprocket wheel from the head shaft, and means for preventing rotation in one direction of the wheel on the head shaft.

In testimony whereof, I have hereunto set my hand.

GUSTAVE E. HUTTELMAIER.

Witnesses:
 JESSE S. COOK,
 KATIE M. CARDLE.

Copies of this patent may be obtained for five cents each, by addressing the "Commissioner of Patents, Washington, D. C."